United States Patent
Yoon

(10) Patent No.: US 11,689,031 B2
(45) Date of Patent: Jun. 27, 2023

(54) BALANCING APPARATUS, AND BATTERY MANAGEMENT SYSTEM AND BATTERY PACK INCLUDING THE SAME

(71) Applicant: LG CHEM, LTD., Seoul (KR)

(72) Inventor: Yeo-Bong Yoon, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 393 days.

(21) Appl. No.: 17/042,011

(22) PCT Filed: Oct. 24, 2019

(86) PCT No.: PCT/KR2019/014081
§ 371 (c)(1),
(2) Date: Sep. 25, 2020

(87) PCT Pub. No.: WO2020/085819
PCT Pub. Date: Apr. 30, 2020

(65) Prior Publication Data
US 2021/0167610 A1 Jun. 3, 2021

(30) Foreign Application Priority Data

Oct. 26, 2018 (KR) .................. 10-2018-0129069

(51) Int. Cl.
*H02J 7/00* (2006.01)
*B60L 58/22* (2019.01)

(52) U.S. Cl.
CPC .......... *H02J 7/0014* (2013.01); *H02J 7/0016* (2013.01); *H02J 7/00032* (2020.01); *H02J 7/007182* (2020.01); *B60L 58/22* (2019.02)

(58) Field of Classification Search
CPC .... H02J 7/0014; H02J 7/00032; H02J 7/0016; H02J 7/007182

(Continued)

(56) References Cited

U.S. PATENT DOCUMENTS 5,164,761 A * 11/1992 Isono ................. G03B 7/26
396/301
6,094,031 A * 7/2000 Shimane ............. B60L 50/64
320/132

(Continued)

FOREIGN PATENT DOCUMENTS

JP 2003-189486 A 7/2003
JP 2003-189490 A 7/2003

(Continued)

OTHER PUBLICATIONS

International Search Report for PCT/KR2019/014081 (PCT/ISA/210) dated Feb. 25, 2020.

(Continued)

*Primary Examiner* — John T Trischler
(74) *Attorney, Agent, or Firm* — Birch, Stewart, Kolasch & Birch, LLP

(57) ABSTRACT

A balancing apparatus, a battery management system and a battery pack including the battery management system are described. The balancing apparatus includes a voltage regulator to generate a first high level voltage from a voltage of an auxiliary battery, a power switch electrically connected to a high voltage node of a battery group, a DC-DC converter to generate a second high level voltage from a voltage applied to a voltage input terminal, a balancing unit including a plurality of balancing circuits connected in parallel to a plurality of battery cells of the battery group; and a control unit to hold the first high level voltage applied to the control terminal of the power switch in response to the second high level voltage being applied to the power terminal.

12 Claims, 8 Drawing Sheets

(58) Field of Classification Search
USPC .......................................................... 320/137
See application file for complete search history.

(56) References Cited

U.S. PATENT DOCUMENTS

| | | | | |
|---|---|---|---|---|
| 6,208,117 B1* | 3/2001 | Hibi | ...................... | H02J 7/0014 320/136 |
| 7,126,312 B2* | 10/2006 | Moore | .................. | H02J 7/0016 320/157 |
| 7,417,405 B2* | 8/2008 | Carrier | .............. | H01M 10/4257 320/116 |
| 7,443,138 B2* | 10/2008 | Ishikawa | ............... | H02J 7/1415 320/118 |
| 7,564,216 B2* | 7/2009 | Carrier | .............. | H01M 10/4257 320/116 |
| 7,915,859 B2* | 3/2011 | Kim | ...................... | H02J 7/0016 320/134 |
| 8,004,238 B2* | 8/2011 | Kim | ...................... | H02J 7/0016 320/125 |
| 8,054,044 B2* | 11/2011 | Kang | .................... | H02J 7/0016 320/124 |
| 8,330,421 B2* | 12/2012 | Nakanishi | ............... | B60L 58/10 320/132 |
| 8,643,500 B2* | 2/2014 | Lee | ......................... | B60L 58/22 320/112 |
| 8,902,072 B2* | 12/2014 | Lee | ......................... | G01R 31/28 340/649 |
| 9,018,956 B2* | 4/2015 | Eguchi | ................. | H02J 7/0016 324/434 |
| 9,130,371 B2* | 9/2015 | Yang | .................... | H02J 7/00304 |
| 9,142,980 B2* | 9/2015 | Lee | ......................... | H01M 10/48 |
| 9,174,547 B2* | 11/2015 | Oh | ............................. | H02J 7/04 |
| 9,252,603 B2* | 2/2016 | Shim | ........................ | H02H 3/10 |
| 9,350,168 B2* | 5/2016 | Cho | .................... | H01M 10/441 |
| 9,461,495 B2* | 10/2016 | Kim | ...................... | H02J 7/0014 |
| 9,793,730 B2* | 10/2017 | Suda | ...................... | H02J 50/10 |
| 9,876,369 B2* | 1/2018 | McCormick | ........... | G01R 31/52 |
| 10,018,683 B2* | 7/2018 | Yoon | .................. | H01M 10/482 |
| 10,063,068 B1* | 8/2018 | McCormick | ........... | H02J 7/0016 |
| 10,576,844 B2* | 3/2020 | Kim | ...................... | H02J 7/0016 |
| 11,125,824 B2* | 9/2021 | Lee | ...................... | H01M 50/204 |
| 11,177,669 B2* | 11/2021 | Sung | .................... | H02J 7/0019 |
| 11,177,683 B2* | 11/2021 | Yoon | .................... | H02J 7/0016 |
| 11,283,274 B2* | 3/2022 | Yoon | .................... | H02J 7/0048 |
| 11,340,285 B2* | 5/2022 | Yoon | .................... | G01R 31/2837 |
| 11,418,041 B2* | 8/2022 | Bober | .................. | H02J 7/0047 |
| 2006/0022639 A1 | 2/2006 | Moore | | |
| 2006/0071643 A1 | 4/2006 | Carrier et al. | | |
| 2007/0120529 A1 | 5/2007 | Ishikawa et al. | | |
| 2008/0185995 A1* | 8/2008 | Carrier | .................. | H02J 7/0014 320/134 |
| 2008/0272739 A1* | 11/2008 | Carrier | ................ | H01M 10/441 320/134 |
| 2011/0025270 A1 | 2/2011 | Nakanishi | | |
| 2012/0062187 A1 | 3/2012 | Shim | | |
| 2013/0127400 A1 | 5/2013 | Oh et al. | | |
| 2013/0293006 A1* | 11/2013 | Kang | .................... | H02J 7/0016 307/9.1 |
| 2014/0084690 A1* | 3/2014 | Cho | .................... | H01M 10/441 307/43 |
| 2014/0253135 A1* | 9/2014 | Eguchi | ................. | G01R 31/385 324/434 |
| 2014/0266062 A1* | 9/2014 | Lee | ..................... | H01M 10/441 320/134 |
| 2015/0008887 A1* | 1/2015 | Kim | ...................... | H02J 7/0063 320/136 |
| 2016/0064984 A1 | 3/2016 | Suda et al. | | |
| 2016/0380443 A1* | 12/2016 | Jeon | ...................... | H02J 7/0014 320/112 |
| 2017/0199250 A1* | 7/2017 | Yoon | ...................... | H01M 10/48 |
| 2017/0271888 A1* | 9/2017 | McCormick | ......... | G01R 31/396 |
| 2019/0023146 A1* | 1/2019 | Lee | ........................ | H01M 10/42 |
| 2019/0135128 A1* | 5/2019 | Kim | ........................ | B60L 58/22 |
| 2019/0356140 A1* | 11/2019 | Sung | .................... | H02J 7/0019 |
| 2019/0361075 A1* | 11/2019 | Lee | ......................... | H02J 1/102 |
| 2020/0036219 A1* | 1/2020 | Yoon | .................... | H02J 7/0026 |
| 2020/0153262 A1* | 5/2020 | Yoon | .................... | H01M 10/42 |
| 2020/0295578 A1* | 9/2020 | Bober | .................. | H02J 7/0016 |
| 2020/0408831 A1* | 12/2020 | Yoon | .................... | G06F 11/0757 |
| 2021/0075067 A1* | 3/2021 | Yoon | .................. | H01M 10/4257 |
| 2021/0265671 A1* | 8/2021 | Chung | .................. | H02J 7/0016 |
| 2021/0265845 A1* | 8/2021 | Kanai | ..................... | B60L 58/22 |
| 2022/0037910 A1* | 2/2022 | Tikhonski | ............. | H02J 7/0063 |
| 2022/0140620 A1* | 5/2022 | Kang | ................ | H02J 7/007182 320/118 |
| 2022/0166239 A1* | 5/2022 | Yoon | ........................ | H02J 7/00 |

FOREIGN PATENT DOCUMENTS

| | | |
|---|---|---|
| JP | 2003-282159 A | 10/2003 |
| JP | 2007-151256 A | 6/2007 |
| JP | 2008-508685 A | 3/2008 |
| JP | 2008-193757 A | 8/2008 |
| JP | 2009-17657 A | 1/2009 |
| JP | 2011-30399 A | 2/2011 |
| JP | 2012-23802 A | 2/2012 |
| JP | 2016-078533 A | 5/2016 |
| KR | 10-2012-0012660 A | 2/2012 |
| KR | 10-1601717 B1 | 3/2016 |
| KR | 10-1602277 B1 | 3/2016 |
| KR | 10-2016-0046221 A | 4/2016 |
| KR | 10-2017-0013445 A | 2/2017 |
| KR | 10-2017-0070557 A | 6/2017 |

OTHER PUBLICATIONS

Extended European Search Report for EP Application No. 19877420.0 dated Jun. 18, 2021.

* cited by examiner

Legend
260 - communication circuit (COMM)
270 - control unit (MPU/MCU)
280 - voltage hold circuit

Legend
260 - communication circuit (COMM)
270 - control unit (MPU/MCU)
280 - voltage hold circuit

Legend
260 - communication circuit (COMM)
270 - control unit (MPU/MCU)
280 - voltage hold circuit

BALANCING APPARATUS, AND BATTERY MANAGEMENT SYSTEM AND BATTERY PACK INCLUDING THE SAME

TECHNICAL FIELD

The present disclosure relates to technology for balancing a state of charge of a plurality of battery cells.

The present application claims priority to Korean Patent Application No. 10-2018-0129069 filed in the Republic of Korea on Oct. 26, 2018, the disclosure of which is incorporated herein by reference.

BACKGROUND ART

Recently, there is dramatically growing demand for portable electronic products such as laptop computers, video cameras and mobile phones, and with the extensive development of electric vehicles, accumulators for energy storage, robots and satellites, many studies are being made on high performance batteries that can be recharged repeatedly.

Currently, commercially available batteries include nickel-cadmium batteries, nickel-hydrogen batteries, nickel-zinc batteries, lithium batteries and the like, and among them, lithium batteries have little or no memory effect, and thus they are gaining more attention than nickel-based batteries for their advantages that recharging can be done whenever it is convenient, the self-discharge rate is very low and the energy density is high.

A battery pack may include a plurality of battery cells and a battery management system. The battery management system is provided to manage the condition of the plurality of battery cells. With the increasing charge/discharge cycles of the battery pack, an imbalance in the state of charge between the plurality of battery cells occurs. Despite the imbalance, if the battery pack is continuously repeatedly charged and discharged, the battery pack cannot be fully used, and the life of the plurality of battery cells reduces rapidly. To solve these problems, suggestions have been made as to a balancing apparatus for balancing the state of charge of the plurality of battery cells.

However, the balancing apparatus according to the related art can perform the operation of balancing the state of charge of the plurality of battery cells only while power required to operate the balancing apparatus is being supplied from an auxiliary battery (e.g., a lead-acid battery) separately provided in an electrically powered device (e.g., an electric vehicle) having the battery pack mounted thereon.

DISCLOSURE

Technical Problem

The present disclosure is designed to solve the above-described problem, and therefore the present disclosure is directed to providing a balancing apparatus for maintaining an operation of balancing a state of charge of a plurality of battery cells using the plurality of battery cells as a power source even when the power supply from an auxiliary battery is stopped during the operation of balancing the state of charge of the plurality of battery cells, and a battery management system and a battery pack including the same.

These and other objects and advantages of the present disclosure may be understood by the following description and will be apparent from the embodiments of the present disclosure. In addition, it will be readily understood that the objects and advantages of the present disclosure may be realized by the means set forth in the appended claims and a combination thereof.

Technical Solution

A battery balancing apparatus according to an aspect of the present disclosure includes a voltage regulator configured to selectively generate a first high level voltage from a voltage of an auxiliary battery, a power switch including a first current terminal, a second current terminal and a control terminal, the first current terminal being electrically connected to a high voltage node of a battery group, a DC-DC converter including a voltage input terminal and a voltage output terminal, the DC-DC converter being configured to generate a second high level voltage from a voltage applied to the voltage input terminal and output the second high level voltage to the voltage output terminal, and the voltage input terminal being electrically connected to the second current terminal, a balancing unit including a plurality of balancing circuits, the plurality of balancing circuits being connected in parallel to a plurality of battery cells included in the battery group, respectively, and a control unit including a power terminal, a hold terminal and a plurality of balancing terminals, the power terminal being electrically connected to the voltage output terminal, the hold terminal being electrically connected to the control terminal, and the plurality of balancing terminals being electrically connected to the plurality of balancing circuits, respectively. The control unit is configured to hold the first high level voltage through the hold terminal in response to the second high level voltage being applied to the power terminal.

Each balancing circuit includes a resistor and a balancing switch connected in series. Each balancing switch is electrically connected to a respective balancing terminal.

When the control unit receives a balancing request message including information indicating a cell identification number and a required balancing period from a master controller, the control unit may be configured to set any one battery cell corresponding to the cell identification information among the plurality of battery cells as a balancing target. The control unit may be configured to control the balancing switch of the balancing circuit connected in parallel to the balancing target among the plurality of balancing circuits to an ON-state, while the second high level voltage is applied to the power terminal.

The control unit may be configured to count a period of time during which the balancing switch of the balancing circuit connected in parallel to the balancing target is controlled to the ON-state. The control unit may be configured to stop holding the first high level voltage when the counted period of time reaches the required balancing period.

The balancing apparatus may further include a communication circuit configured to connect the master controller and the control unit to allow bidirectional communication between the master controller and the control unit.

The power switch may be turned to the ON-state when the first high level voltage is applied to the control terminal. The second high level voltage may be applied to the power terminal while the power switch is in the ON-state.

The power switch may be an n-channel Metal Oxide Semiconductor Field Effect transistor (MOSFET) including a source as the first current terminal, a drain as the second current terminal and a gate as the control terminal.

The control unit may further include a hold capacitor connected between the hold terminal and the ground. The control unit may further include a hold switch connected in parallel to the hold capacitor. The control unit may be configured to control the hold switch to the OFF-state in response to the second high level voltage being applied to the power terminal.

The control unit may further include a disable terminal electrically connected to the high voltage node. The control unit may be configured to control the hold switch to the ON-state when a voltage applied to the disable terminal is less than a threshold voltage.

A battery management system according to another aspect of the present disclosure includes the balancing apparatus.

A battery pack according to still another aspect of the present disclosure includes the battery management system.

Advantageous Effects

According to at least one of the embodiments of the present disclosure, it is possible to maintain an operation of balancing a state of charge of a plurality of battery cells using the plurality of battery cells as a power source for a balancing apparatus even when the power supply from an auxiliary battery is stopped.

In addition, it is possible to automatically stop the operation of balancing the state of charge of the plurality of battery cells when there is a risk that a battery pack will be overdischarged.

The effects of the present disclosure are not limited to the effects mentioned above, and these and other effects will be clearly understood by those skilled in the art from the appended claims.

BRIEF DESCRIPTION OF DRAWINGS

The accompanying drawings illustrate a preferred embodiment of the present disclosure, and together with the detailed description of the present disclosure described below, serve to provide a further understanding of the technical aspects of the present disclosure, and thus the present disclosure should not be construed as being limited to the drawings.

BEST MODE

Figure 1:
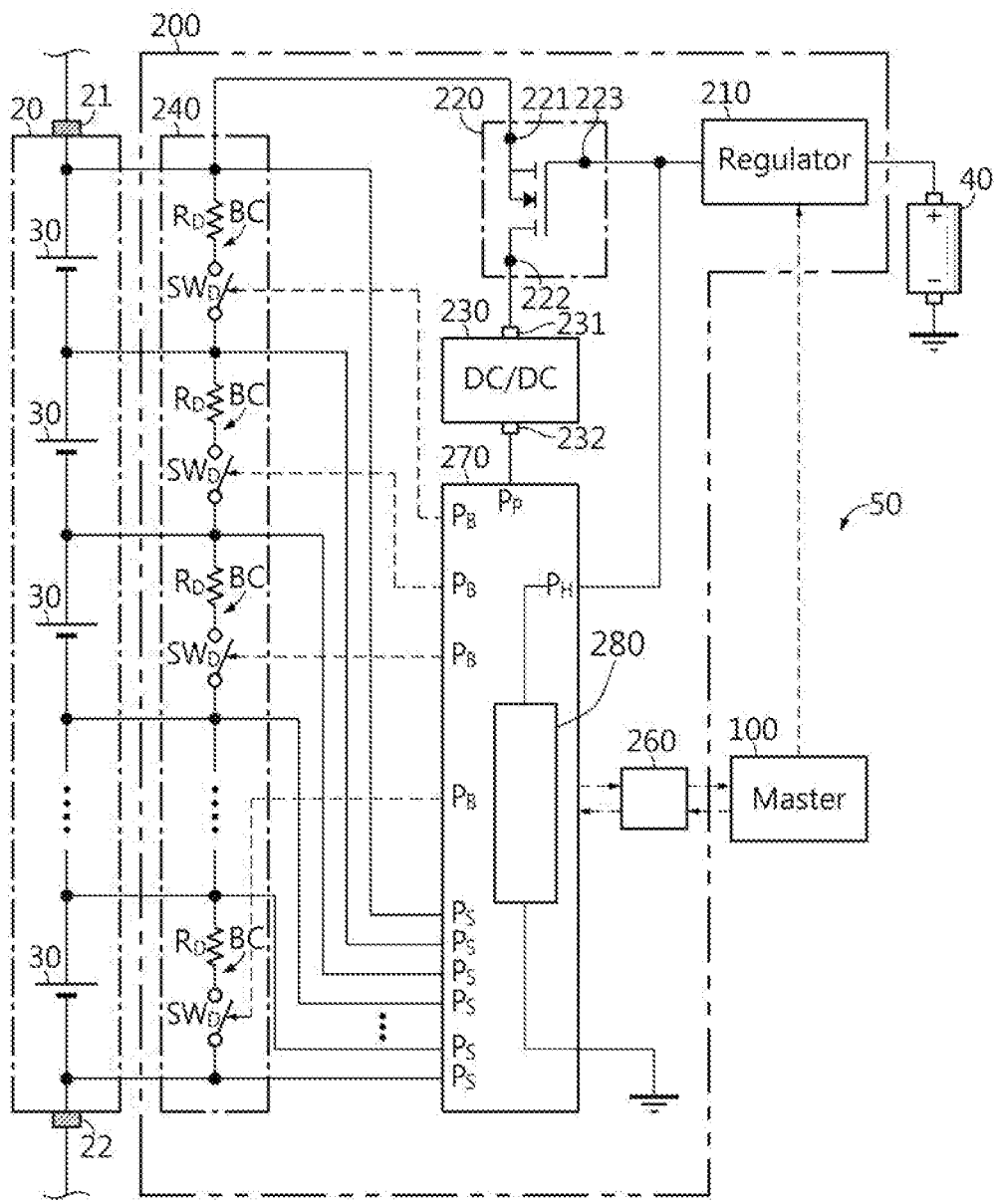
FIG. 1 is an exemplary diagram showing a configuration of a battery pack according to a first embodiment of the present disclosure.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but interpreted based on the meanings and concepts corresponding to the technical aspects of the present disclosure on the basis of the principle that the inventor is allowed to define the terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and modifications could be made thereto at the time of filing the application.

Additionally, in describing the present disclosure, when it is deemed that a certain detailed description of relevant known elements or functions renders the key subject matter of the present disclosure ambiguous, the detailed description is omitted herein.

The terms including the ordinal number such as "first", "second" and the like, are used to distinguish one element from another among various elements, but not intended to limit the elements by the terms.

Unless the context clearly indicates otherwise, it will be understood that the term "comprises" or "includes" when used in this specification, specifies the presence of stated elements, but does not preclude the presence or addition of one or more other elements. Additionally, the term <control unit> as used herein refers to a processing unit of at least one function or operation, and this may be implemented in hardware or software alone or in combination.

In addition, throughout the specification, it will be further understood that when an element is referred to as being "connected to" another element, it can be directly connected to the other element or intervening elements may be present.

Figure 2:
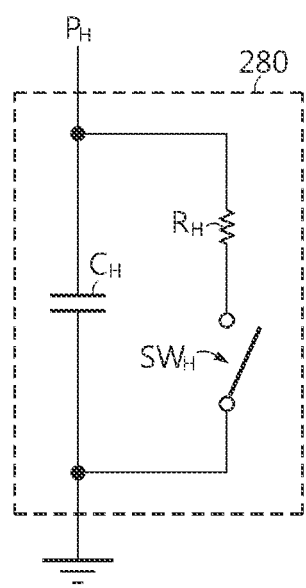
FIG. 2 is an exemplary diagram showing a configuration of a voltage hold circuit included in a control unit shown in FIG. 1.

FIG. 1 is an exemplary diagram showing a configuration of a battery pack 10 according to a first embodiment of the present disclosure, and FIG. 2 is an exemplary diagram showing a configuration of a voltage hold circuit 280 included in a control unit 270 shown in FIG. 1.

Referring to FIG. 1, the battery pack 10 includes a battery group 20 and a battery management system 50, and may supply power to an electric motor of an electric vehicle.

The battery group 20 includes a high voltage terminal 21, a low voltage terminal 22 and a plurality of battery cells 30. The plurality of battery cells 30 may be electrically connected in series between the high voltage terminal 21 and the low voltage terminal 22. The battery cell 30 is not limited to a particular type and may include any rechargeable one, for example, the lithium ion cell 30.

The battery management system 50 includes a master controller 100 and a balancing apparatus 200.

The master controller 100 is operably coupled to the balancing apparatus 200. The master controller 100 is configured to control the balancing apparatus 200 based on notification information from the balancing apparatus 200. The master controller 100 may control a voltage regulator 210 to supply the power from an auxiliary battery 40 to the balancing apparatus 200 in response to the start-up of the electric vehicle having the battery pack 10 mounted thereon.

The balancing apparatus 200 includes the voltage regulator 210, a power switch 220, a DC-DC converter 230, a balancing unit 240 and a control unit 270. The balancing apparatus 200 may further include a communication circuit 260.

While in operation, the voltage regulator 210 is configured to generate a first high level voltage (e.g., 5V) from the voltage (e.g., 12V) of the auxiliary battery 40. The voltage regulator 210 may be a low-dropout (LDO) regulator. The auxiliary battery 40 may include, for example, a lead-acid battery. While the electrically powered device having the battery pack 10 mounted thereon is working, the master controller 100 may operate the voltage regulator 210, and accordingly, the voltage regulator 210 may output the first high level voltage to the power switch 220. While the electric vehicle is stopped, the master controller 100 may stop the operation of the voltage regulator 210, and accordingly, the voltage regulator 210 may stop outputting the first high level voltage.

The power switch 220 includes a first current terminal 221, a second current terminal 222 and a control terminal 223. The power switch 220 may include an n-channel Metal Oxide Semiconductor Field Effect transistor (MOSFET). The n-channel MOSFET includes a source (or a drain) as the first current terminal 221, a drain (or a source) as the second current terminal 222 and a gate as the control terminal 223. The first current terminal 221 is electrically connected to the high voltage terminal 21 of the battery group 20. The control terminal 223 is electrically connected to the voltage regulator 210 to receive the first high level voltage from the voltage regulator 210. The power switch 220 is controlled to an ON-state in response to the first high level voltage being applied to the control terminal 223. While the power switch 220 is in the ON-state, the current may flow from the first current terminal 221 to the second current terminal 222. The power switch 220 is turned to an OFF-state in response to a low level voltage (e.g., 0V) less than the first high level voltage being applied to the control terminal 223. While the power switch 220 is in the OFF-state, the flow of current between the first current terminal 221 and the second current terminal 222 may be interrupted.

The DC-DC converter 230 includes a voltage input terminal 231 and a voltage output terminal 232. The DC-DC converter 230 may include a voltage drop circuit such as, for example, a switched mode power supply (SMPS). The voltage input terminal 231 is electrically connected to the second current terminal 222. While the power switch 220 is in the ON-state, the DC-DC converter 230 is configured to generate a second high level voltage from the voltage applied to the voltage input terminal 231, and output the second high level voltage to the voltage output terminal 232. The second high level voltage may be used as a power source for the operation of the control unit 270. While the power switch 220 is in the OFF-state, the generation of the second high level voltage by the DC-DC converter 230 is stopped.

The balancing unit 240 includes a plurality of balancing circuits BC. The plurality of balancing circuits BC is connected in parallel to the plurality of battery cells 30 included in the battery group 20. That is, the balancing circuit BC that can be connected in parallel to each battery cell 30 is provided to each battery cell 30. Each balancing circuit BC includes a discharge resistor $R_D$ and a balancing switch $SW_D$ electrically connected in series. That is, the balancing unit 240 includes a plurality of discharge resistors $R_D$ and a plurality of balancing switches $SW_D$. The balancing switch $SW_D$ may include a known switching device such as an n-channel MOSFET. The plurality of balancing switches $SW_D$ is controlled into the ON-state or the OFF-state by the control unit 270.

The communication circuit 260 is configured to connect the master controller 100 and the control unit 270 to allow bidirectional communication. The communication circuit 260 supports wired or wireless communication between the master controller 100 and the control unit 270. The wired communication may be, for example, controller area network (CAN) communication, and the wireless communication may be, for example, Zigbee or Bluetooth communication.

The control unit 270 may be implemented in hardware using at least one of application specific integrated circuits (ASICs), digital signal processors (DSPs), digital signal processing devices (DSPDs), programmable logic devices (PLDs), field programmable gate arrays (FPGAs), microprocessors and electrical units for performing other functions. Additionally, the control unit 270 may have a memory device embedded therein, and the memory device may include, for example, RAM, ROM, register, hard disk, optical recording media or magnetic recording media. The memory device may store, update and/or erase programs including various types of control logics that are executed by the control unit 270, and/or data created when the control logics are executed. The control unit 270 may be referred to as a 'slave controller' due to being under the control of the master controller 100.

The control unit 270 includes a plurality of sensing terminals $P_S$, a power terminal $P_P$, a hold terminal $P_H$, a power hold circuit 280 and a plurality of balancing terminals $P_B$.

The plurality of sensing terminals $P_S$ is electrically connected to a positive terminal and a negative terminal of each of the plurality of battery cells 30. Accordingly, the control unit 270 may detect a voltage between adjacent pairs among the plurality of sensing terminals $P_S$ as a voltage of each of the plurality of battery cells 30.

The power terminal $P_P$ is electrically connected to the voltage output terminal 232 of the DC-DC converter 230 to receive the second high level voltage. The second high level voltage may refer to a voltage or a voltage range required for the operation of the control unit 270.

The hold terminal $P_H$ is electrically connected to the control terminal 223 to receive the first high level voltage. Accordingly, the first high level voltage from the voltage regulator 210 may be simultaneously applied to the control terminal 223 and the hold terminal $P_H$.

The power hold circuit 280 may include a hold capacitor $C_H$ and a hold switch $SW_H$. The hold capacitor $C_H$ is electrically connected between the hold terminal $P_H$ and the ground. The hold switch $SW_H$ is electrically connected in parallel to the hold capacitor $C_H$. The power hold circuit 280 may further include a discharge resistor $R_H$. The discharge resistor $R_H$ is electrically connected in series to the hold switch $SW_H$, and is electrically connected in parallel to the hold capacitor $C_H$.

The control unit 270 is configured to control the hold switch $SW_H$ to the OFF-state to hold the first high level voltage applied to the control terminal 223 through the hold terminal $P_H$ in response to the second high level voltage being applied to the power terminal $P_P$.

Holding the first high level voltage represents that the first high level voltage applied to the control terminal 223 is charged in the hold capacitor $C_H$ through the hold terminal $P_H$. While the first high level voltage is being held by the hold capacitor $C_H$, even when the voltage regulator 210 stops outputting the first high level voltage, the power switch 220 is kept in the ON-state, and thus the control unit 270 may continue the operation of balancing the state of charge of the plurality of battery cells 30 using the plurality of battery cells 30 as a power source for the control unit 270.

The plurality of balancing terminals $P_B$ is electrically connected to the plurality of balancing circuits BC. That is, the plurality of balancing switches $SW_D$ may be electrically connected to each of the plurality of balancing terminals $P_B$ one by one. The control unit 270 is configured to selectively output a switching signal for controlling the ON/OFF of each of the plurality of balancing switches $SW_D$ to the plurality of balancing terminals $P_B$.

The control unit 270 is electrically connected to the positive terminal and the negative terminal of each of the plurality of battery cells 30 through the balancing unit 240. The control unit 270 is configured to detect an open circuit voltage (OCV) of each of the plurality of battery cells 30 using a plurality of differential amplifiers and an analog-digital converter provided in the control unit 270, and generate notification information including a voltage signal indicating the detected open circuit voltage. The notification information may be transmitted to the master controller 100 through the communication circuit 260.

The master controller 100 determines the state of charge of each of the plurality of battery cells 30 based on the voltage signal by referencing a lookup table in which data indicating a relationship between the state of charge and the open circuit voltage is recorded. The master controller 100 determines a maximum, a minimum and a cell ID from the state of charge of each of the plurality of battery cells 30, and determines a required balancing period based on a difference between the maximum and the minimum. The cell ID indicates identification information of the battery cell 30 having the maximum state of charge. Additionally, the required balancing period may be proportional to the difference between the maximum and the minimum. Subsequently, the master controller 100 may generate a balancing request message including information indicating the cell ID and the required balancing period. The balancing request message may be transmitted to the control unit 270 through the communication circuit 260.

When the control unit 270 receives the balancing request message through the communication circuit 260, the control unit 270 sets one battery cell 30 corresponding to the cell ID among the plurality of battery cells 30 as a balancing target. While the second high level voltage is applied to the power terminal $P_P$, the control unit 270 may control the balancing switch $SW_D$ of one balancing circuit BC connected in parallel to the balancing target among the plurality of balancing circuits BC to the ON-state, and control all the remaining balancing switches $SW_D$ into the OFF-state. Accordingly, as electrical energy of the battery cell 30 set as the balancing target is consumed by the discharge resistor $R_D$ of the balancing circuit BC including the balancing switch $SW_D$ being controlled to the ON-state, the state of charge of the balancing target gradually reduces toward the minimum.

The control unit 270 may count an accumulated balancing period of the balancing target using a timer provided in the control unit 270. The accumulated balancing period is a period of time during which the balancing switch $SW_D$ of the balancing circuit BC connected in parallel to the balancing target is controlled to the ON-state in response to the balancing request message received by the control unit 270.

When the accumulated balancing period reaches the required balancing period, the control unit 270 may stop holding the first high level voltage. Stopping holding the first high level voltage represents that the control unit 270 controls the hold switch $SW_H$ to the ON-state to discharge the hold capacitor $C_H$. Accordingly, the first high level voltage cannot be held by the hold capacitor $C_H$ from the time point at which the accumulated balancing period reaches the required balancing period, and the power switch 220 may be turned to the ON-state only when the voltage regulator 210 re-starts outputting the first high level voltage.

Figure 3:
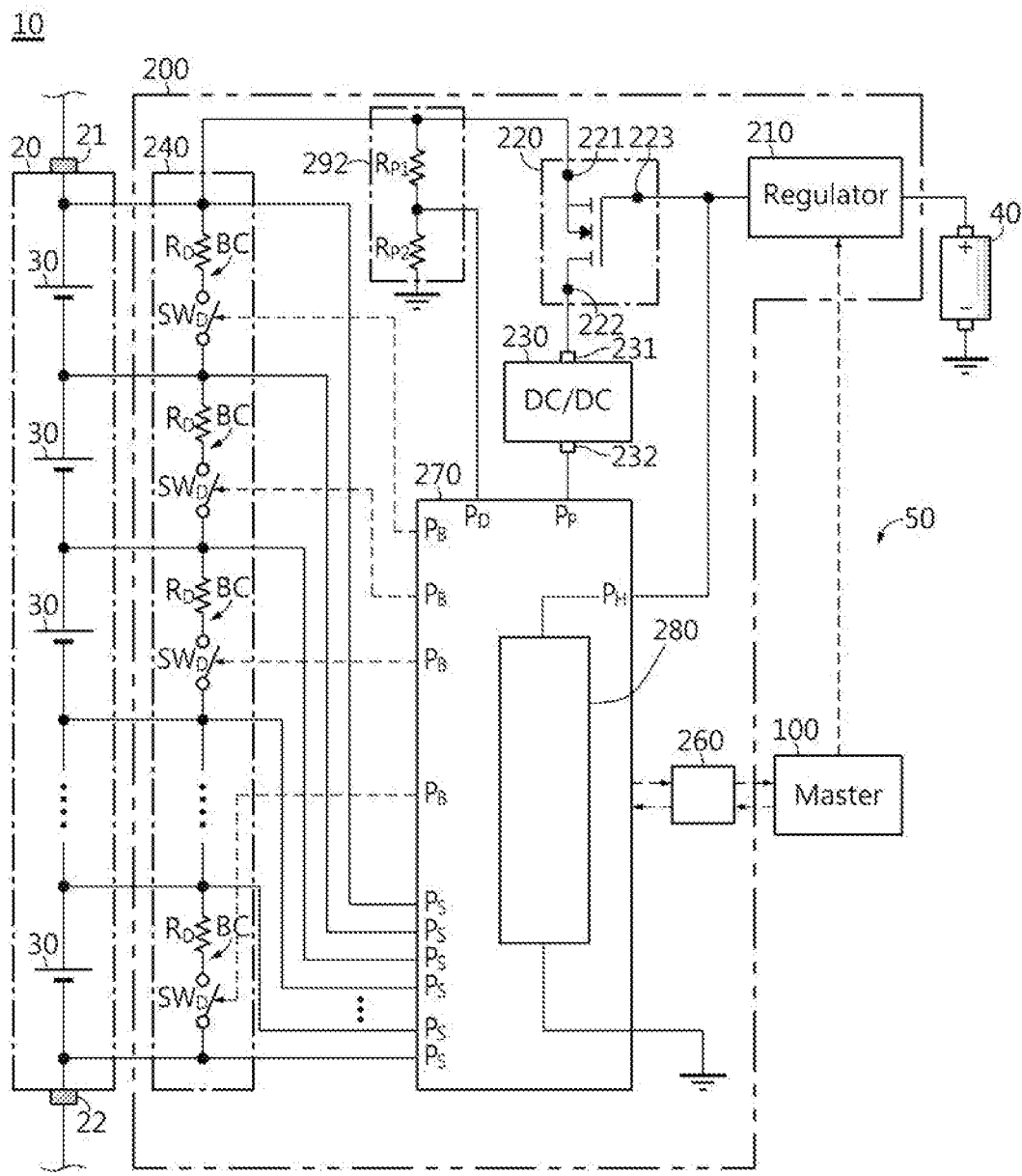
FIG. 3 is an exemplary diagram showing a configuration of a battery pack according to a second embodiment of the present disclosure.

FIG. 3 is an exemplary diagram showing a configuration of a battery pack 10 according to a second embodiment of the present disclosure.

Description in common between the battery pack 10 according to the second embodiment as shown in FIG. 3 and the first embodiment described above with reference to FIGS. 1 and 2 is omitted herein to avoid redundancy, and their difference(s) will be described below.

A difference between the battery pack 10 of the second embodiment and the battery pack 10 of the first embodiment is that the balancing apparatus 200 further includes a voltage divider 292, and the control unit 270 further includes a disable terminal $P_D$.

The voltage divider 292 is configured to generate a diagnosis voltage using the voltage of the high voltage terminal 21. The voltage divider 292 includes a protection resistor $R_{P1}$ and a protection resistor $R_{P2}$ connected in series between the high voltage terminal 21 and the ground. That is, one end of the protection resistor $R_{P1}$ is electrically connected to the high voltage terminal 21, one end of the protection resistor $R_{P2}$ is electrically connected to the ground, and the other end of the protection resistor $R_{P1}$ is electrically connected to the other end of the protection resistor $R_{P2}$. Accordingly, the voltage between the high voltage terminal 21 and the ground is divided by the protection resistor $R_{P1}$ and the protection resistor $R_{P2}$. The diagnosis voltage is a voltage across the protection resistor $R_{P2}$. When $V_G$ is the voltage between the high voltage terminal 21 and the ground, $r_{P1}$ is the resistance of the protection resistor $R_{P1}$, $r_{P2}$ is the resistance of the protection resistor $R_{P2}$, and $V_D$ is the diagnosis voltage, $V_D = V_G \times \{r_{P2}/(r_{P1}+r_{P2})\}$.

The disable terminal $P_D$ is electrically connected to the other end of the protection resistor $R_{P2}$. When the diagnosis voltage applied to the disable terminal $P_D$ is less than a predetermined threshold voltage, the control unit 270 may control the hold switch $SW_H$ into ON to prevent the battery group 20 from being overdischarged.

As described above, controlling the hold switch $SW_H$ into ON represents that the hold capacitor $C_H$ cannot be charged with the first high level voltage. Even before the accumulated balancing period reaches the required balancing period, when the diagnosis voltage is less than the threshold voltage, the power terminal $P_P$ cannot be maintained at the first high level voltage any longer. Accordingly, the power switch 220 is turned OFF, thereby protecting the battery group 20 from overdischarge.

Figure 4:
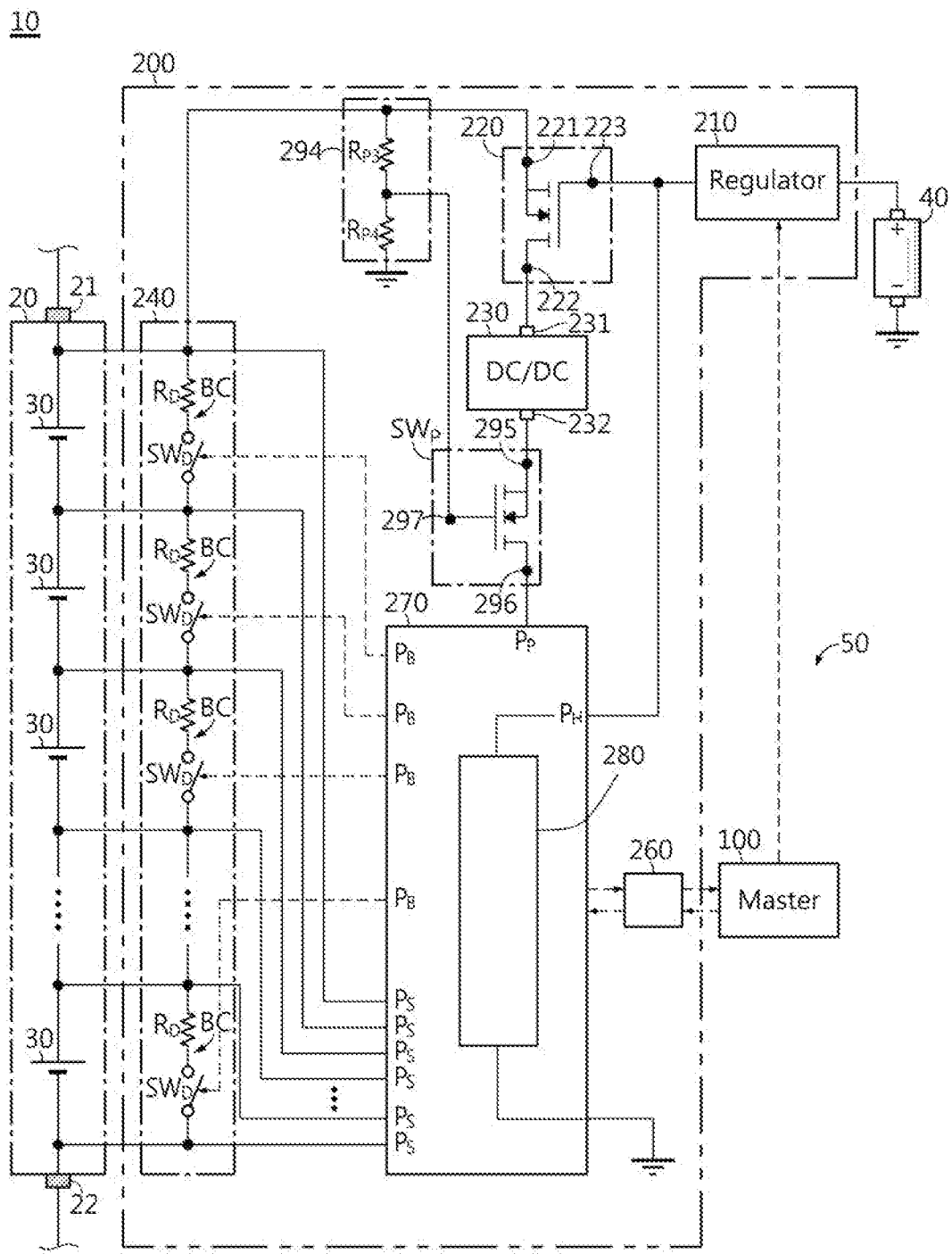
FIG. 4 is an exemplary diagram showing a configuration of a battery pack according to a third embodiment of the present disclosure.

FIG. 4 is an exemplary diagram showing a configuration of a battery pack 10 according to a third embodiment of the present disclosure.

Description in common between the battery pack 10 according to the third embodiment as shown in FIG. 4 and the first and second embodiments described above with reference to FIGS. 1 to 3 is omitted herein to avoid redundancy, and their difference(s) will be described below.

A difference between the battery pack 10 of the third embodiment and the battery pack 10 of the first embodiment is that the balancing apparatus 200 further includes a voltage divider 294 and a protection switch $SW_P$.

The voltage divider 294 is configured to generate a protection voltage using the voltage of the high voltage terminal 21. The voltage divider 294 includes a protection resistor $R_{P3}$ and a protection resistor $R_{P4}$ connected in series between the high voltage terminal 21 and the ground. That is, one end of the protection resistor $R_{P3}$ is electrically connected to the high voltage terminal 21, one end of the protection resistor $R_{P4}$ is electrically connected to the ground, and the other end of the protection resistor $R_{P3}$ is electrically connected to the other end of the protection resistor $R_{P4}$. Accordingly, the voltage between the high voltage terminal 21 and the ground is divided by the protection resistor $R_{P3}$ and the protection resistor $R_{P4}$. The protection voltage is a voltage across the protection resistor $R_{P4}$. When $V_G$ is the voltage between the high voltage terminal 21 and the ground, $r_{P3}$ is the resistance of the protection resistor $R_{P3}$, $r_{P4}$ is the resistance of the protection resistor $R_{P4}$, and $V_P$ is the protection voltage, $V_P=V_G\times\{r_{P4}/(r_{P3}+r_{P4})\}$.

The protection switch $SW_P$ includes a first current terminal 295, a second current terminal 296 and a control terminal 297. The protection switch $SW_P$ may include a known switching device such as an n-channel MOSFET. The first current terminal 295 of the protection switch $SW_P$ is electrically connected to the voltage output terminal 232 of the DC-DC converter 230. The second current terminal 296 of the protection switch $SW_P$ is electrically connected to the power terminal $P_P$ of the control unit 270. The control terminal 297 of the protection switch $SW_P$ is electrically connected to the other end of the protection resistor $R_{P4}$.

When the protection voltage is equal to or higher than a third high level voltage, the protection switch $SW_P$ is turned to the ON-state. On the contrary, when the protection voltage is less than the third high level voltage, the protection switch $SW_P$ is turned OFF. The protection voltage less than the third high level voltage may represent that the state of charge of the battery group 20 fell below the lower limit (e.g., 20%) of a predetermined normal range. While the protection switch $SW_P$ is in OFF, the power transmission path from the high voltage terminal 21 to the power terminal $P_P$ of the control unit 270 is interrupted, thereby preventing the battery group 20 from being overdischarged.

Figure 5:
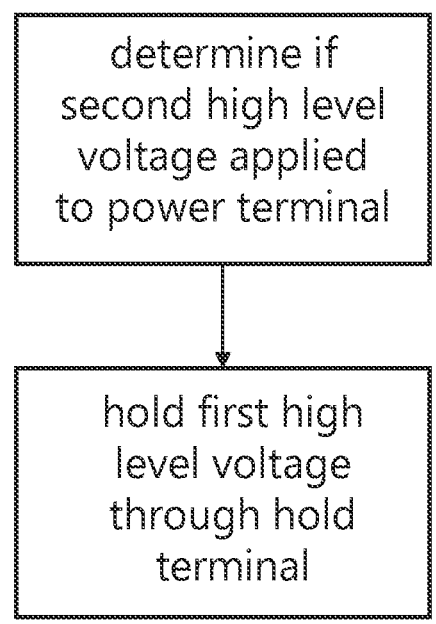
FIG. 5 is a flowchart of an algorithm of the control unit according claim 1 of the present invention.

FIG. 5 is a flowchart of an algorithm of the control unit according claim 1 of the present invention, in which the control unit determines if a second high level voltage is being applied to the power terminal, and if so, holds the first high level voltage through the hold terminal.

Figure 6:
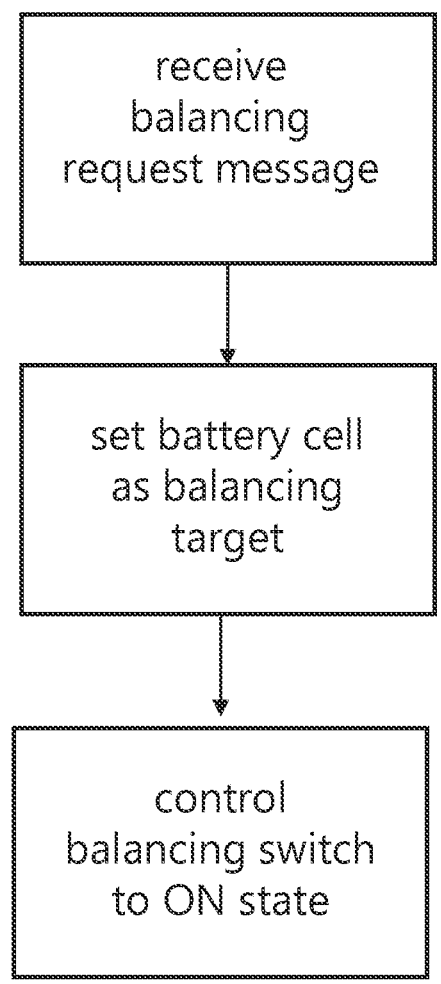
FIG. 6 is flowchart of an algorithm of the control unit according claim 3 of the present invention.

FIG. 6 is flowchart of an algorithm of the control unit according claim 3 of the present invention, in which the control unit receives a balancing request message including information indicating a cell identification number and a required balancing period from a master controller, the control unit sets one battery cell corresponding to the cell identification information among the plurality of battery cells as a balancing target, and controls the balancing switch of the balancing circuit connected in parallel to the balancing target among the plurality of balancing circuits to an ON-state, while the second high level voltage is applied to the power terminal.

Figure 7:
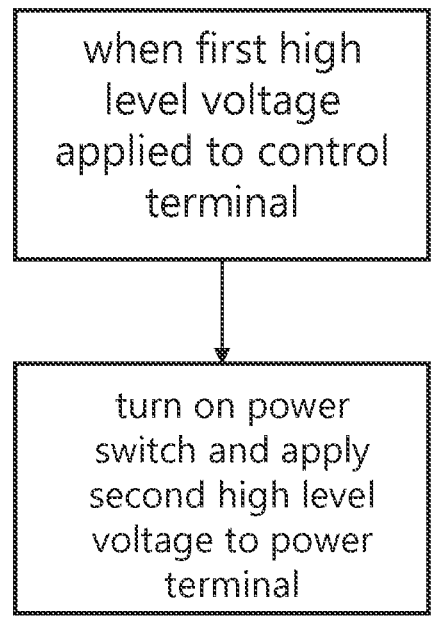
FIG. 7 is flowchart of an algorithm of the control unit according claim 6 of the present invention.

FIG. 7 is flowchart of an algorithm of the control unit according claim 6 of the present invention, in which the control unit controls the power switch to an ON-state and the second high level voltage is applied to the power terminal when the first high level voltage is applied to the control terminal.

Figure 8:
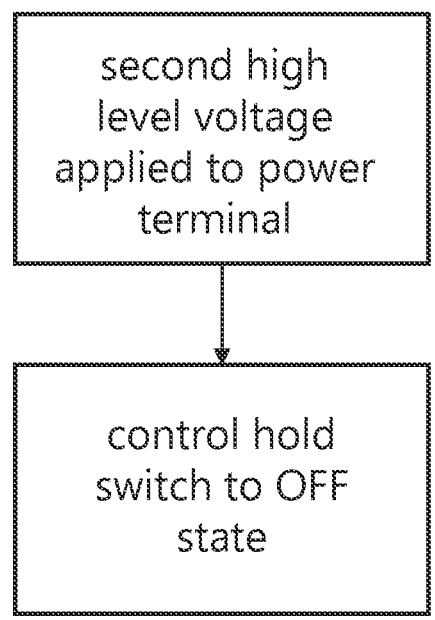
FIG. 8 is flowchart of an algorithm of the control unit according claim 9 of the present invention.

FIG. 8 is flowchart of an algorithm of the control unit according claim 9 of the present invention, in which the control unit controls the hold switch to an OFF-state in response to the second high level voltage being applied to the power terminal.

Figure 9:
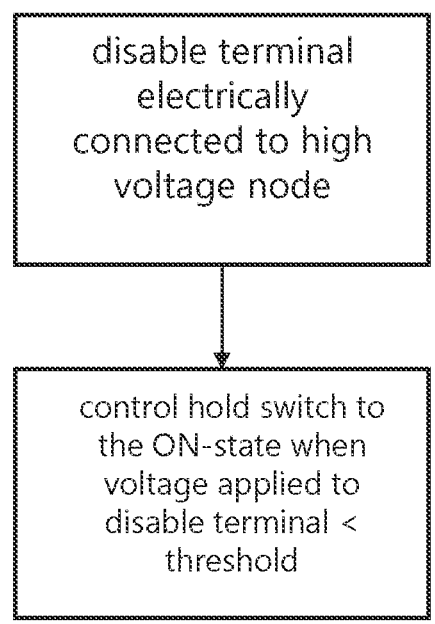
FIG. 9 is flowchart of an algorithm of the control unit according claim 10 of the present invention.

FIG. 9 is flowchart of an algorithm of the control unit according claim 10 of the present invention in which the control unit controls the hold switch to the ON-state when a voltage applied to the disable terminal is less than a threshold voltage.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

Additionally, as many substitutions, modifications and changes may be made to the present disclosure described hereinabove by those skilled in the art without departing from the technical aspects of the present disclosure, the present disclosure is not limited by the above-described embodiments and the accompanying drawings, and some or all of the embodiments may be selectively combined to allow various modifications.

What is claimed is:

1. A battery balancing apparatus, comprising:
   a voltage regulator configured to selectively generate a first high level voltage from a voltage of an auxiliary battery;
   a power switch including a first current terminal, a second current terminal and a control terminal, the first current terminal being electrically connected to a high voltage node of a battery group;
   a DC-DC converter including a voltage input terminal and a voltage output terminal, the DC-DC converter being configured to generate a second high level voltage from a voltage applied to the voltage input terminal and output the second high level voltage to the voltage output terminal, and the voltage input terminal being electrically connected to the second current terminal;
   a balancing unit including a plurality of balancing circuits, the plurality of balancing circuits being connected in parallel to a plurality of battery cells included in the battery group, respectively; and
   a control unit including a power terminal, a hold terminal and a plurality of balancing terminals, the power terminal being electrically connected to the voltage output terminal, the hold terminal being electrically connected to the control terminal, and the plurality of balancing terminals being electrically connected to the plurality of balancing circuits, respectively,
   wherein the control unit is configured to hold the first high level voltage through the hold terminal in response to the second high level voltage being applied to the power terminal.

2. The battery balancing apparatus according to claim 1, wherein the power switch is turned to the ON-state when the first high level voltage is applied to the control terminal, and
   wherein the second high level voltage is applied to the power terminal while the power switch is in the ON-state.

3. The battery balancing apparatus according to claim 1, wherein the power switch is an n-channel Metal Oxide Semiconductor Field Effect transistor (MOSFET) including a source as the first current terminal, a drain as the second current terminal and a gate as the control terminal.

4. The battery balancing apparatus according to claim 1, wherein the control unit further includes a hold capacitor connected between the hold terminal and ground.

5. The battery balancing apparatus according to claim 4, wherein the control unit further includes a hold switch connected in parallel to the hold capacitor, and
 the control unit is configured to control the hold switch to an OFF-state in response to the second high level voltage being applied to the power terminal.

6. The battery balancing apparatus according to claim 5, wherein the control unit further includes a disable terminal electrically connected to the high voltage node, and
 wherein the control unit is configured to control the hold switch to the ON-state when a voltage applied to the disable terminal is less than a threshold voltage.

7. The battery balancing apparatus according to claim 1, wherein each balancing circuit includes a resistor and a balancing switch connected in series, and
 each balancing switch is electrically connected to a respective balancing terminal.

8. The battery balancing apparatus according to claim 7, wherein when the control unit receives a balancing request message including information indicating a cell identification number and a required balancing period from a master controller, the control unit is configured to set one battery cell corresponding to the cell identification information among the plurality of battery cells as a balancing target, and the control unit is configured to control the balancing switch of the balancing circuit connected in parallel to the balancing target among the plurality of balancing circuits to an ON-state, while the second high level voltage is applied to the power terminal.

9. The battery balancing apparatus according to claim 8, wherein the control unit is configured to count a period of time during which the balancing switch of the balancing circuit connected in parallel to the balancing target is controlled to the ON-state, and
 the control unit is configured to stop holding the first high level voltage when the counted period of time reaches the required balancing period.

10. The battery balancing apparatus according to claim 8, further comprising:
 a communication circuit configured to connect the master controller and the control unit to allow bidirectional communication between the master controller and the control unit.

11. A battery management system comprising the battery balancing apparatus according to claim 1.

12. A battery pack comprising the battery management system according to claim 11.

* * * * *